(12) United States Patent
Pohl

(10) Patent No.: US 11,198,117 B2
(45) Date of Patent: Dec. 14, 2021

(54) LONGITUDINAL GRADIENT CHROMATOGRAPHY COLUMNS

(71) Applicant: DIONEX CORPORATION, Sunnyvale, CA (US)

(72) Inventor: Christopher A. Pohl, Union City, CA (US)

(73) Assignee: Dionex Corporation, Sunnyvale, CA (US)

( * ) Notice: Subject to any disclaimer, the term of this patent is extended or adjusted under 35 U.S.C. 154(b) by 116 days.

(21) Appl. No.: 16/673,881

(22) Filed: Nov. 4, 2019

(65) Prior Publication Data

US 2021/0129128 A1 May 6, 2021

(51) Int. Cl.
*B01D 15/36* (2006.01)
*B01J 20/28* (2006.01)
(Continued)

(52) U.S. Cl.
CPC ............ *B01J 47/04* (2013.01); *B01D 15/363* (2013.01); *B01J 20/286* (2013.01);
(Continued)

(58) Field of Classification Search
CPC ................. B01D 15/362; B01D 15/363; B01J 20/28007; B01J 20/286; B01J 41/05;
(Continued)

(56) References Cited

U.S. PATENT DOCUMENTS 7,291,395 B2   11/2007   Pohl et al.
7,468,130 B2   12/2008   Liu et al.
(Continued)

FOREIGN PATENT DOCUMENTS

EP   3257583 A1   12/2017
WO   2011106720 A2   9/2011
(Continued)

OTHER PUBLICATIONS

Pohl, C., "Preparation of ion exchange columns with longitudinal stationary phase gradients", Heliyon, 7, pp. 1-8. (Year: 2021).*
(Continued)

*Primary Examiner* — Benjamin L Lebron

(57) ABSTRACT

An ion exchange chromatography column contains an ion exchange stationary phase that includes a charged substrate, a plurality of first particles, and a plurality of second particles. The plurality of first particles each include ion exchange groups and the first particles are ionically bound to the charged substrate. The plurality of second particles each include second ion exchange groups and the second particles are ionically bound to the charged substrate. The first particles having a first ion exchange group density, and the second particles having a second ion exchange group density. The first ion exchange group density is greater than the second ion exchange group density. The ion exchange chromatography column has a number of zones connected in series where each zone can have a varying level of first ion exchange groups and second ion exchange group from the inlet zone to the outlet zone.

21 Claims, 9 Drawing Sheets

CHARGED SUBSTRATE

FIRST PARTICLE     SECOND PARTICLE

SECOND PARTICLE

(51) Int. Cl.
*B01J 20/286* (2006.01)
*B01J 41/05* (2017.01)
*B01J 41/07* (2017.01)
*B01J 41/14* (2006.01)
*B01J 41/20* (2006.01)
*B01J 47/022* (2017.01)
*B01J 47/04* (2006.01)
*G01N 30/60* (2006.01)
*G01N 30/96* (2006.01)

(52) U.S. Cl.
CPC ......... *B01J 20/28007* (2013.01); *B01J 41/05* (2017.01); *B01J 41/07* (2017.01); *B01J 41/14* (2013.01); *B01J 41/20* (2013.01); *B01J 47/022* (2013.01); *G01N 30/6069* (2013.01); *G01N 30/96* (2013.01); *B01D 15/362* (2013.01); *B01J 2220/44* (2013.01)

(58) Field of Classification Search
CPC ... B01J 41/07; B01J 41/14; B01J 41/20; B01J 47/022; B01J 47/04; B01J 2220/44; G01N 30/6069; G01N 30/96
See application file for complete search history.

(56) References Cited

U.S. PATENT DOCUMENTS

| | | | |
|---|---|---|---|
| 9,034,447 | B2 | 5/2015 | Pohl et al. |
| 9,132,364 | B2 | 9/2015 | Srinivasan et al. |
| 9,283,494 | B2 | 3/2016 | Pohl et al. |
| 9,314,712 | B2 * | 4/2016 | Liu ..................... B01J 20/3221 |
| 9,486,799 | B2 | 11/2016 | Pohl |
| 2005/0181224 | A1 | 8/2005 | Pohl et al. |
| 2006/0180549 | A1 | 8/2006 | Liu et al. |
| 2007/0062854 | A1 | 3/2007 | Pohl et al. |
| 2009/0130767 | A1 | 5/2009 | Liu et al. |
| 2011/0210055 | A1 | 9/2011 | Srinivasan et al. |
| 2012/0231195 | A1 | 9/2012 | Pohl et al. |
| 2014/0069870 | A1 | 3/2014 | Pohl |
| 2016/0370329 | A1 | 12/2016 | Jayaraman et al. |

FOREIGN PATENT DOCUMENTS

| | | |
|---|---|---|
| WO | 2012125493 A1 | 9/2012 |
| WO | 2014043174 A1 | 3/2014 |
| WO | 2018136666 A1 | 7/2018 |
| WO | 20180136666 A1 | 7/2018 |

OTHER PUBLICATIONS

Pohl et al.: "New developments in the preparation of anion exchange media based on hyperbranched condensation polymers", Journal of Chromatography A, vol. 1213, No. 1, Dec. 5, 2008 (Dec. 5, 2008), pp. 37-44, XP025841764, ISSN: 0021-9673. DOI: 10.1016/J.CHROMA.2008.10.072 [retrieved on Oct. 22, 2008].ol. 1213, No. 1, pp. 37-44.

Dionex Data Sheet 60507, IonPac AS24 AG24, 34 pgs., Dec. 2008.
Dionex Data Sheet, IonPac AS24 Anion-Exchange Column, 5 pgs., Dec. 22, 2008.
Dionex IonPac AS26 Column Product Manual, 065444-03, 49 pgs., Jun. 2013.
IonPac AS24A Anion-Exchange Column, Dionex Data Sheet 70335, 6 pgs., 2013.
IonPac AS24A Column, Dionex Product Manual, 065464-04, 55 pgs., May 2013.
IonPac AS26 Anion-Exchange Column, 70830 Data Sheet, 6 pgs., 2013.

* cited by examiner

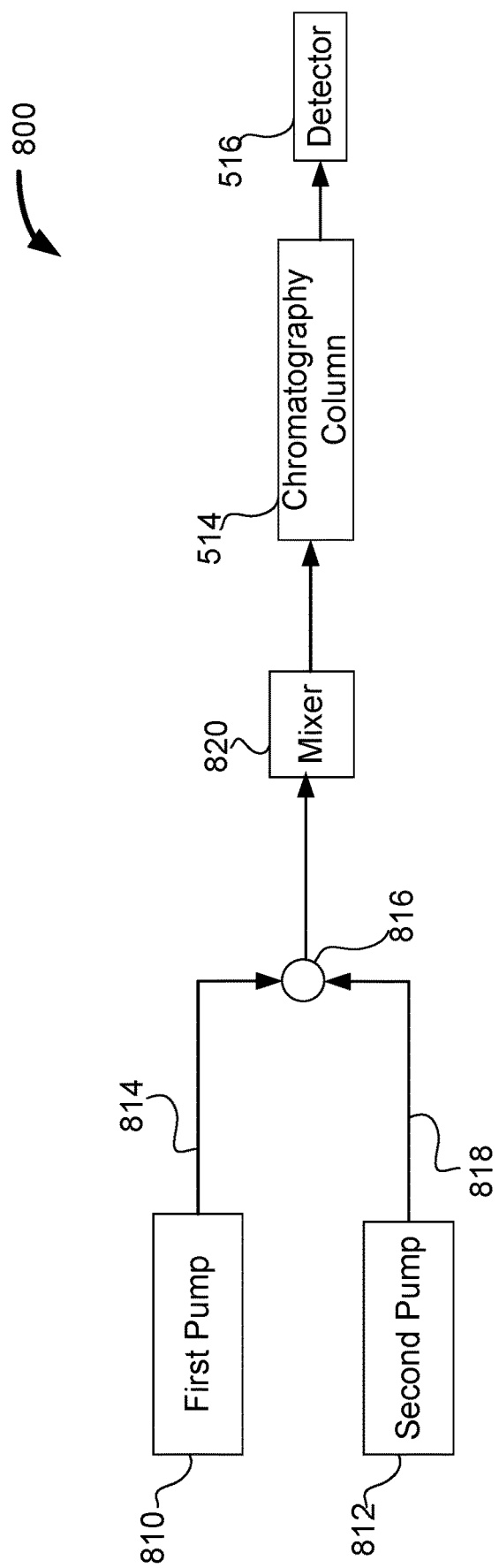

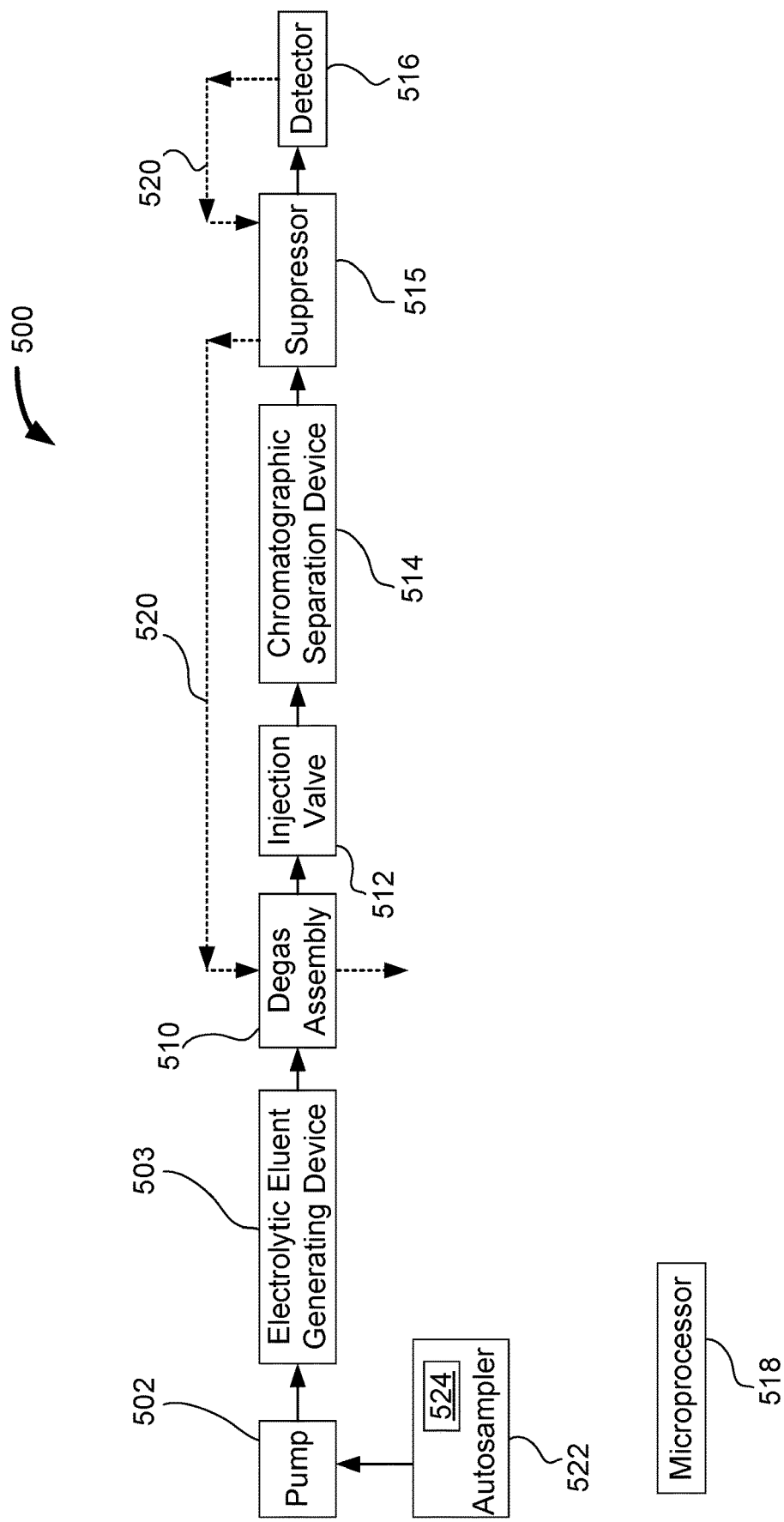

LONGITUDINAL GRADIENT CHROMATOGRAPHY COLUMNS

FIELD OF THE INVENTION

The invention generally relates to chromatography columns having a non-uniform distribution of ion exchange sites for applications such as separating a sample that include ions.

BACKGROUND

Chromatography is a widely used analytical technique for the chemical analysis and separation of molecules. Chromatography involves the separation of one or more analyte species from other matrix components present in a sample. A stationary phase of a chromatography column is typically selected so that there is an interaction with the analyte. The stationary phase is the material that stays fixed inside of the chromatography column. Such interactions with the stationary phase can be ionic, hydrophilic, hydrophobic, or a combination thereof. For example, the stationary phase can be derivatized with ionic moieties that ideally will bind to ionic analytes and matrix components with varying levels of affinity. A mobile phase is percolated through the stationary phase and competes with the analyte and matrix components for binding to the ionic moieties. The mobile phase or eluent are terms used to describe a liquid solvent or buffer solution that is pumped through a chromatography column. During this competition, the analyte and matrix components will elute off of the stationary phase as a function of time and then be subsequently detected at a detector. Examples of some typical detectors are a conductivity detector, a UV-VIS spectrophotometer, and a mass spectrometer. Over the years, chromatography has developed into a powerful analytical tool that is useful for creating a healthier, cleaner, and safer environment where complex sample mixtures can be separated and analyzed for various industries such as water quality, environmental monitoring, food analysis, pharmaceutical, and biotechnology.

Applicant believes that there is a need to create chromatography columns that provide chromatographic peaks having improved efficiency and narrower peak widths at half height.

SUMMARY

A first embodiment of an ion exchange chromatography column contains an ion exchange stationary phase that includes a charged substrate, a plurality of first particles, and a plurality of second particles. The plurality of first particles each include first ion exchange groups and the first particles are ionically bound to the charged substrate. The plurality of second particles each include second ion exchange groups and the second particles are ionically bound to the charged substrate. The first particles having a first ion exchange group density, and the second particles having a second ion exchange group density. The first ion exchange group density is greater than the second ion exchange group density. The first ion exchange groups and the second ion exchange groups both have a net charge of a same polarity. The ion exchange chromatography column has a number of zones connected in series where the number of the zones range from about two to about ten. Each zone includes an inlet zone and an outlet zone. A distance from the inlet zone to the inlet of the chromatography column is less than a distance from the outlet zone to the inlet of the chromatography column. A distance from the outlet zone to the outlet of the chromatography column is less than a distance from the inlet zone to the outlet of the chromatography column. The first particles are bound to the charged substrate at an initial first particle concentration at the inlet zone and a concentration of the first particles bound to the charged substrate decreases linearly from the inlet zone towards the outlet zone to form a final first particle concentration bound to the charged substrate at the outlet zone. The second particles are bound to the charged substrate at an initial second particle concentration at the inlet zone and a concentration of the second particles bound to the charged substrate increases linearly from the inlet zone towards the outlet zone to form a final second particle concentration bound to the charged substrate at the outlet zone.

A second embodiment of an ion exchange chromatography column contains an ion exchange stationary phase that includes a charged substrate, a plurality of first particles, and a plurality of second particles. The plurality of first particles each include ion exchange groups and first particles are ionically bound to the charged substrate. The plurality of second particles each include ion exchange groups and the second particles are ionically bound to the charged substrate. The first particles having a first ion exchange group density, and the second particles having a second ion exchange group density. The first ion exchange group density is greater than the second ion exchange group density. The first ion exchange groups and the second ion exchange groups both have a net charge of a same polarity. The first particles are bound to the charged substrate at an initial first particle concentration at the inlet of the chromatography column and a concentration of the first particles bound to the charged substrate decreases linearly from the inlet towards the outlet to form a final first particle concentration bound to the charged substrate. The second particles are bound to the charged substrate at an initial second particle concentration at the inlet and a concentration of the second particles bound to the charged substrate increases linearly from the inlet towards the outlet to form a final second particle concentration bound to the charged substrate.

A third embodiment of an ion exchange chromatography column contains an ion exchange stationary phase. The ion exchange stationary phase is formed by a method that includes treating a charged substrate contained in a chromatography column with a number of treatment cycles. Each treatment cycle includes flowing a mixture of a first solution and a second solution into an inlet of a chromatography column. The first solution contains a plurality of first particles and the second solution contains a plurality of second particles. The first particles include first ion exchange groups at a first ion exchange group density and the second particles include second ion exchange groups at a second ion exchange group density. The first ion exchange groups and the second ion exchange groups have a net charge of a same polarity. The mixture is at an initial first particle concentration at a beginning of the treatment cycle and decreases to a final first particle concentration at an end of the treatment cycle, and the mixture is at an initial second particle concentration at the beginning of the treatment cycle and increases to a final second particle concentration at the end of the treatment cycle. The charged substrate has a charge opposite to a) a charge of the first particles, and b) a charge of the second particles. The first ion exchange group density is greater than the second ion exchange group density.

In regards to the first, second, or third embodiments, the charged substrate includes a plurality of crosslinked divinylbenzene and ethylvinyl benzene particles having a negative charge, in which at least a surface of the particle includes a sulfonate group.

In regards to the first, second, or third embodiments, the first particle can have a diameter ranging from 30 nm to 60 nm, and the second particle can have a diameter ranging from 30 nm to 60 nm. The negatively charged substrate can be in the form of a particle and have a diameter ranging from 4 microns to 7 microns.

In regards to the first, second, or third embodiments, the second ion exchange group density ranges from about 10% to about 50% of the first ion exchange density.

In regards to the first, second, or third embodiments, the final first particle concentration and the initial second concentration are both about zero In regards to the first, second, or third embodiments, the final first concentration is about 10% or less than the initial first concentration, and the initial second particle concentration is about 10% or less than the final second particle concentration.

In regards to the first, second, or third embodiments, the ion exchange groups of the first particles and the second particles are each independently selected from a group consisting of a primary amine, a secondary amine, a tertiary amine, a quaternary amine, and a combination thereof. Alternatively, the ion exchange groups of the first particles and the second particles are each independently selected from a group consisting of a sulfonate, a carboxylate, and a combination thereof.

In regards to the first, second, or third embodiments, the first particles and the second particles each include quaternary amines.

In regards to the first, second, or third embodiments, the second particles each further include zwitterionic groups.

In regards to the first, second, or third embodiments, the first particles and the second particles are each ionically bound to the charged substrate.

In regards to the third embodiment, the number of treatment cycles is one.

In regards to the third embodiment, the number of treatment cycles ranges from about two to about ten.

In regards to the third embodiment, each treatment cycle can have a time duration ranging from about 1 minute to about 20 minutes.

In regards to the third embodiment, each treatment cycle can have a time duration ranging from about 10 minutes to about 20 minutes.

In regards to the third embodiment, the method further includes flowing the first solution into a mixer and flowing the second solution into the mixer to form the mixture before the flowing of the mixture into the inlet of the chromatography column.

In regards to the third embodiment, the method further includes calculating a breakthrough volume for flowing either the first solution or the second solution. The mixture of the first solution and the second solution that is flowed into the inlet of the chromatography column has a volume for one treatment cycle. The volume for each treatment cycle multiplied by the number of treatment cycles equals the breakthrough volume.

In regards to any of the above embodiments, the first ion exchange groups and the second ion exchange group are anion exchange groups, and the net charge of the same polarity is positive.

A method of using any of the chromatography columns described in the embodiments above includes flowing an eluent through the chromatography column, injecting a sample into the chromatography column, and measuring one or more analytes with a detector that elute off of the column. The eluent can be flowed with a gradient elution where the eluent concentration changes with time into a longitudinal gradient chromatography column.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention (wherein like numerals represent like elements).

FIG. 8 illustrates a simplified schematic of a system for coating a chromatography column with two types of fine layering particles.

FIG. 9 illustrates an embodiment of a chromatography system suitable for use with the chromatographic columns described herein.

DETAILED DESCRIPTION OF EMBODIMENTS

Figure 1:
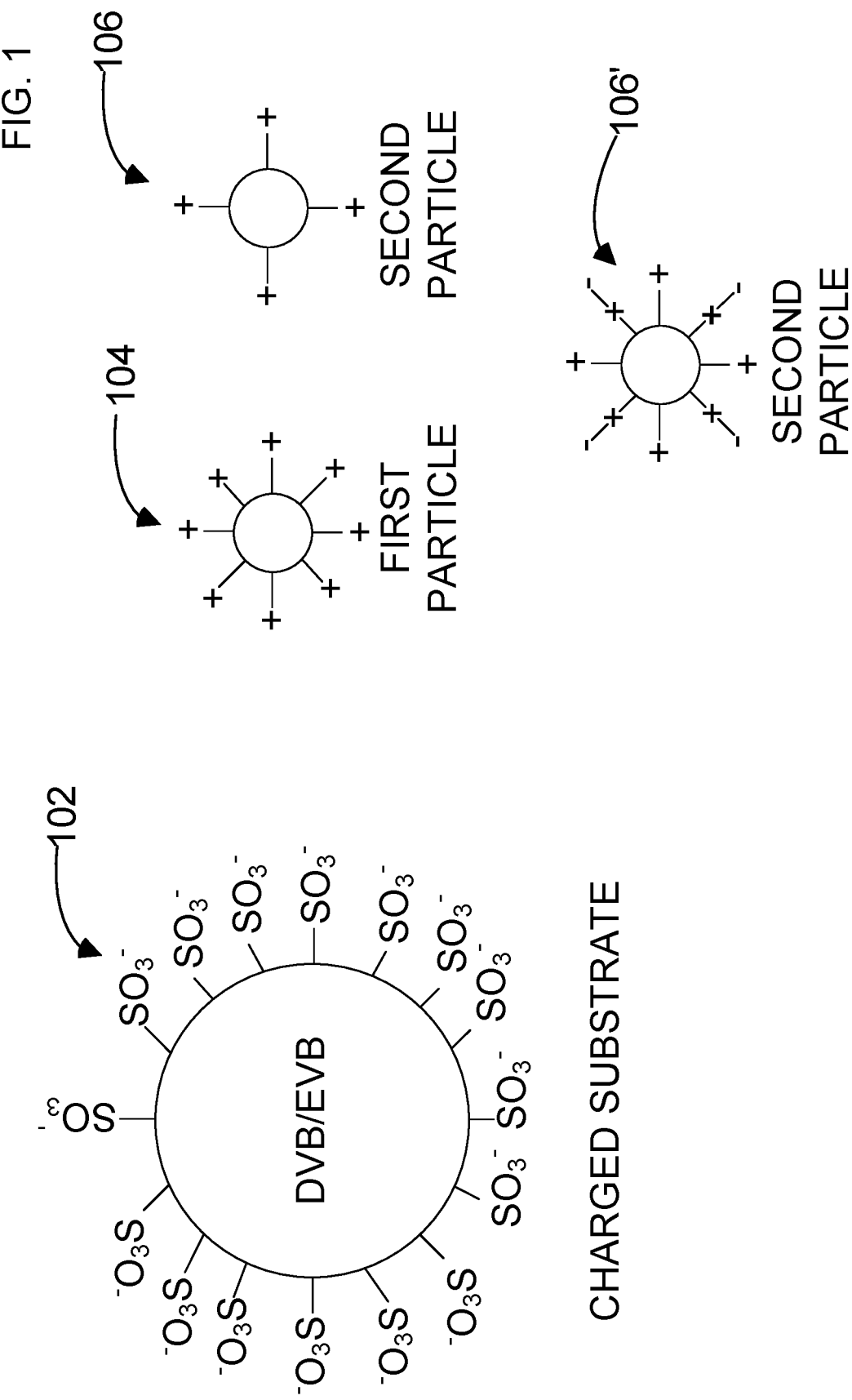
FIG. 1 illustrates a schematic of a charged substrate particle, a first particle, and second particle where the first particle and the second particle can ionically bind to the charged substrate particle.

The following detailed description should be read with reference to the drawings, in which like elements in different drawings are identically numbered. The drawings, which are not necessarily to scale, depict selected embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used herein, the terms "about" or "approximately" for any numerical values or ranges indicate a suitable dimensional tolerance that allows the part or collection of components to function for its intended purpose as described herein.

Herein the term "alkyl," by itself or as part of another substituent, means, unless otherwise stated, a straight or branched chain, or cyclic hydrocarbon radical, or combination thereof, which may be fully saturated, mono- or polyunsaturated and can include di- and multivalent radicals, having the number of carbon atoms designated (i.e., $C_1$-$C_{10}$ means one to ten carbons). Examples of saturated hydrocarbon radicals include, but are not limited to, groups such as methyl, ethyl, n-propyl (e.g., —CH$_2$—CH$_2$—CH$_3$, —CH$_2$—CH$_2$—CH$_2$—), isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below, such as "heteroalkyl". Alkyl groups that are limited to hydrocarbon groups are termed "homoalkyl". The term "alkyl" can also mean "alkylene" or "alkyldiyl" as well as alkylidene in those cases where the alkyl group is a divalent radical.

Herein the term "alkylene" or "alkyldiyl" by itself or as part of another substituent means a divalent radical derived from an alkyl group, as exemplified, but not limited, by —CH$_2$CH$_2$CH$_2$— (propylene or propane-1,3-diyl), and further includes those groups described below as "heteroalkylene". Typically, an alkyl (or alkylene) group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl", "lower alkylene" or "lower alkyldiyl" is a shorter chain alkyl, alkylene or alkyldiyl group, generally having about 10 or fewer carbon atoms, about 8 or fewer carbon atoms, about 6 or fewer carbon atoms or about 4 or fewer carbon atoms.

Herein the term "alkylidene" by itself or as part of another substituent means a divalent radical derived from an alkyl group, as exemplified, but not limited, by CH$_3$CH$_2$CH$_2$= (propylidene). Typically, an alkylidene group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl" or "lower alkylidene" is a shorter chain alkyl or alkylidene group, generally having about 10 or fewer carbon atoms, about 8 or fewer carbon atoms, about 6 or fewer carbon atoms or about 4 or fewer carbon atoms.

Herein the terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

Herein the term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si, S and B, and wherein the nitrogen and sulfur atoms may optionally be oxidized and the nitrogen heteroatom may optionally be quaternized. The heteroatom(s) O, N, B, S and Si may be placed at any interior position of the heteroalkyl group or at the position at which the alkyl group is attached to the remainder of the molecule. Examples include, but are not limited to, —CH$_2$—CH$_2$—O—CH$_3$, —CH$_2$—CH$_2$—NHCH$_3$, —CH$_2$—CH$_2$—N(CH$_3$)—CH$_3$, —CH$_2$—S—CH$_2$—CH$_3$, —CH$_2$—CH$_2$, —S(O)—CH$_3$, —CH$_2$—CH$_2$—S(O)$_2$—CH$_3$, —CH=CH—O—CH$_3$, —Si(CH$_3$)$_3$, —CH$_2$—CH=N—OCH$_3$, and —CH=CH—N(CH$_3$)—CH$_3$. Up to two heteroatoms may be consecutive, such as, for example, —CH$_2$—NH—OCH$_3$ and —CH$_2$—O—Si(CH$_3$)$_3$. Similarly, the term "heteroalkylene" by itself or as part of another substituent means a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Optionally, for alkylene and heteroalkylene linking groups, no orientation of the linking group is implied by the direction in which the formula of the linking group is written. For example, the formula —CO$_2$R'— optionally represents both —C(O)OR' and —OC(O)R'.

Herein the terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

Herein the terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo($C_1$-$C_4$)alkyl" is mean to include, but not be limited to, trifluoromethyl, 2,2,2-trifluoroethyl, 4-chlorobutyl, 3-bromopropyl, and the like.

Herein the term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl groups (or rings) that contain from one to four heteroatoms selected from N, O, S, Si and B, wherein the nitrogen and sulfur atoms are optionally oxidized, and the nitrogen atom(s) are optionally quaternized. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, herein the term "aryl" when used in combination with other terms (e.g., aryloxy, arylthioxy, arylalkyl) includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl" and "heteroaryl") are meant to include both substituted and unsubstituted forms of the indicated radical. Preferred substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR— C(NR'R"R'")=NR"", —NR—C(NR'R")=NR'", —S(O)R', —S(O)$_2$R', —OS(O)$_2$R', —S(O)$_2$NR'R", —NRSO$_2$R', —CN and —NO$_2$ in a number ranging from zero to (2m'+1), where m' is the total number of carbon atoms in such radical. R', R", R'" and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R'" and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

Similar to the substituents described for the alkyl radical, substituents for the aryl and heteroaryl groups are generically referred to as "aryl group substituents." The substituents are selected from, for example: substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R'", —OC(O)R', —C(O)R', —CO$_2$R', —CONR'R", —OC(O)NR'R", —NR"C(O)R', —NR'— C(O)NR"R'", —NR"C(O)$_2$R', —NR—C (NR'R"R'")=NR"", —NR—C(NR'R")=NR'", —S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxy, and fluoro(C$_1$-C$_4$)alkyl, in a number ranging from zero to the total number of open valences on the aromatic ring system; and where R', R", R'" and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R'" and R"" groups when more than one of these groups is present.

Chromatographic columns can be prepared by packing or forming chromatographic media into a column that is uniformly distributed throughout the column either as a packed bed, a monolithic structure or a thin-film coating the walls of the column. In contrast, a chromatographic column can be prepared with a longitudinal gradient where the ion exchange sites are not uniformly distributed throughout the column. Chromatography columns typically have a cylindrical shape with a longitudinal axis that is parallel to the flow of fluid from the inlet to the outlet. A gradient typically refers to an increase or decrease in concentration (e.g., ion exchange groups) as a function of time or distance (from inlet to outlet). A longitudinal gradient chromatography column can refer to a column having an increasing or decreasing ion exchange group density from the inlet towards the outlet. A longitudinal gradient chromatography column can also refer to a column prepared with reagents (e.g., first and/or second ion exchange particles) having an increasing or decreasing concentration as a function of time. In an embodiment, the change in concentration for a cycle can be continuous where the reagent continuously flows during the time period.

In another embodiment, the change in concentration can be based on a non-continuous flow of reagents by injecting a series of reagent aliquots in a manner typically used for injecting a sample to be analyzed. A step change in reagent concentration can be introduced by a series of reagent injections. It should be noted that the following features can be varied in the injection process, which are the number of injections, the volume of the injection, the magnitude of the step change in reagent concentration between injections, and the frequency of the injections to tailor the chromatographic material to have particular separation properties. For example, the charged substrate can be coated with 50 injections of solutions containing the first and second particles. The concentration ratio of the first particle to the second particle may be varied by 2% with each injection as a linear gradient over the entire column length (e.g., 100:0, 98:2, 96:4, etc.) for a cycle. This injection sequence can be repeated for several cycles until all of the injections equal the breakthrough volume which could be for example around 7.5 mL.

In an embodiment, a bed of particles can be coated with smaller ion exchange particles where the smaller ion exchange particles are flowed through the bed of particles with a gradient concentration mechanism. A bed of particles can be a plurality of particles that are packed into a chromatography column under pressure and can also be referred to as a packed bed. The longitudinal gradient chromatography columns can be used in an eluent gradient mode to cause double-focusing of the chromatography peaks. This refocusing of peaks reduce distortion due to overload conditions, diffusion, and mass transport related band broadening.

In an embodiment, small ion exchange particles (e.g., latex particles or fine layering particles) can coat the stationary phase support particles after the column is packed. A first solution of a first small ion exchange particles can be flowed into an inlet of a chromatography column where the concentration of the first small ion exchange particles decreases with time to form a gradient from the inlet to the outlet of the column. At the same time, a second solution of a second small ion exchange particles can be flowed into the inlet of the chromatography column where the concentration of the second small ion exchange particles increases with time to form a gradient from the inlet to the outlet of the column. The first small ion exchange particles and the second small ion exchange particles can have different characteristics such as capacity.

In an alternative embodiment, a first solution of a first small ion exchange particles can be flowed into an inlet of a chromatography column where the concentration of the first small ion exchange particles increases with time to form a gradient from the inlet to the outlet of the column. At the same time, a second solution of a second small ion exchange particles can be flowed into the inlet of the chromatography column where the concentration of the second small ion exchange particles decreases with time to form a gradient from the inlet to the outlet of the column. The first small ion exchange particles and the second small ion exchange particles can have different characteristics such as capacity. This alternative embodiment can be used where the affinity of the second small ion exchange particles for ions is significantly higher than the first small ion exchange particles. Under certain circumstances, it is preferable to start with a high concentration of the high affinity particles to reduce the likelihood that the second small ion exchange particles cause a distortion of the separation that is done by the gradient of first ion exchange particles.

For a capacity gradient column, a mixture of ion exchange particles can be a batch of smaller latex particles that have a nominal particle diameter of 50 nm and a separate batch of larger latex particles that have a nominal particle diameter of 100 nm. A colloidal dispersion of smaller latex particles at the beginning of the coating process can be flowed into a chromatography column where the percentage of larger latex particles flowing into the chromatography column increases with time. The larger latex particles have the same selectivity and ion exchange group charge density in the colloidal dispersion while pumping the mixture through a column. However, the ion exchange capacity is directly proportional to the particle diameter. The ratio of the smaller (50 nm) and larger (100 nm) latex particles inputted into the column can be varied with time such that the inlet zone of the column is coated with 50 nm particles while the outlet zone of the column is coated with 100 nm particles and the intervening section of the column contains a progressive increase in the concentration of 100 nm particles while a corresponding decrease in the concentration of 50 nm particles occur simultaneously. The net effect of such a gradient would be that the outlet of the column would have twice the specific capacity of the inlet of the column. Because electrostatic attachment of the latex particles to the bed of particles (e.g., charged substrate) results in an essentially instantaneous uptake of any particles as they first come in contact with an oppositely charged surface, preparing a suitable concentration of colloidal particles allows for precise control of the location of mixtures of particles as the particles are pumped over the column.

In addition to using latex particle size as a means of adjusting ion exchange capacity over the length of the column, a mixture of a colloidal particle and a soluble polymer having a net charge of a same polarity can also be used as a means for controlling the ion exchange capacity over the length of the column. Since uncrosslinked soluble polymer can bind to the bed of particles and the bound soluble polymer contributes relatively little retention of analyte ions in comparison to a cross-linked colloidal particle having a net charge of a same polarity. Mixing various concentrations of soluble polymer and colloidal particles allows for direct control of capacity in a manner similar to what was described above for mixtures of 2 different latex batches containing particles of different sizes.

A second type of longitudinal gradient is a charge density gradient. In this case, a single batch of functionalized latex particles can be functionalized in such a way that the concentration of ion exchange groups varies between 2 different batches of functionalized latex particles. For example, if the functional amine used to produce an anion exchange resin is dimethylethanolamine, the charge density of the colloidal latex particle is determined by the concentration of the functional monomer in the latex particle and the cross-link of the latex particle. However, if a mixture of methyldiethanolamine (MDEOHA) and dimethylglycine ethyl ester (DMGEE) is used to functionalize the latex particles, base hydrolysis will convert the dimethylglycine ethyl ester to a quaternary zwitterionic group while the methyl diethanolamine will produce a quaternary ion exchange group. By varying the ratio of the 2 amines (MDEOHA and DMGEE), various charge densities can be produced. Since charge density affects retention of polyvalent species much more dramatically than monovalent species, it can be used as a means of manipulating elution order as a function of eluent ionic strength.

The third type of ion exchange gradient is a selectivity gradient. For example, one latex batch can be prepared using a hydrophobic tertiary amine while another latex batch can be prepared using a hydrophilic tertiary amine. If a composition gradient is prepared on the column, this will result in a column which is more hydrophilic on one end of the column than on the other end of the column.

First, both a capacity gradient and a charge density gradient can result in improved peak efficiency when the gradient is oriented so that the phases most retentive at the outlet end of the column. Under such conditions, the focusing effect of such a gradient will reduce band broadening effects commonly observed under overload conditions. Likewise, one generally observes decreasing efficiency when operating at low flow rates where diffusion limits the efficiency of the separation and that high flow rates where mass transport limits efficiency of the separation. The focusing effect of a longitudinal gradient will tend to offset band broadening that would otherwise occur during overload conditions or when operating at high flow rate or at low flow rate.

Finally, when operating under gradient conditions where there is a concentration gradient in opposition to the column capacity/charge density gradient (i.e. the eluent concentration is progressively increased over time while the capacity of the column or the charge density the column progressively increases from the inlet to the outlet of the column), one will observe a double-focusing effect. The increasing retention observed as the column passes down the column will tend to focus the leading edge of the analyte band as it passes through the column while the increasing concentration of the eluent will tend to focus the trailing edge of the analyte band. The combination of the 2 factors (a gradient column plus gradient elution mode) will result in a more highly focused peak than can be achieved with either gradient alone.

Although all the previous examples involved a continuous gradient of a selected property, gradients of multiple properties simultaneously may also be implemented. A gradient property can be varied along the length of the column from inlet to outlet. Alternatively, the gradient property can be varied in a repeating pattern several times along the length of the column from inlet to outlet. Examples of a repeating pattern can have different gradient "shapes" such as a sawtooth, an oscillating gradient, or a sine wave may be used in preparing longitudinal gradient columns. The gradients can be an ascending gradient for focusing peaks or can be a descending gradient for defocusing. It should be noted that the gradients can be introduced using a gradient pump with a proportioning valve or using multiple, successive injections into a flowing stream FIG. 1 illustrates a schematic of a charged substrate 102, a first particle 104, and second particle 106/106' where the first particle 104 and the second particle 106/106' can ionically bind to the charged substrate particle 102 in an irreversible manner. The charged substrate 102 can be in the form of a particle having sulfuric acid groups. The charged substrate 102 can be coated with a plurality of first particles 104 and second particles 106 and in aggregate form an ionic complex configured to be anion exchange stationary phase. In an embodiment, essentially all of the negatively charged sulfonate groups are ionically bound to the positively charged first or second particles. However, the bound first or second particles will still have positively charged anion exchange groups that are still accessible so that anion exchange separations can be performed with the ionic complex.

In an embodiment, the first particle and second particle both have a plurality of positively charged anion exchange groups where the first particle has more anion exchange groups per unit volume that the second particle. Both first particle and second particle can be prepared such that they also both have zwitterionic groups. Introducing more zwitterionic groups on the second particle than the first particle can be a way of reducing the amount anion exchange groups on the second particle without exposing the hydrophobic surface of the second particles. For illustrative purposes, second particle 106' is shown that has zwitterionic groups. As will be described below in Example 2, the proportion of zwitterionic groups added to a particle can be increased by increasing the concentration of a particular reagent such as, for example, dimethylglycine ethyl ester (DMGEE). The zwitterionic groups themselves have a net neutral charge, and thus, are not ion exchange groups. Although the first and second particles can have different anion exchange group density, the net charge of the first and second particles will have a same polarity (e.g., net positive charge).

The first particle and second particle may be referred to as latex particles. It is worthwhile to note that the first particle can have a higher density of ion exchange groups per unit volume than the second particle. The number of ion exchange groups per unit volume for a particle may be referred to as the specific capacity, ion exchange group density, ion exchange group charge density, ion exchange density, and charge density. It is worthwhile to note that zwitterionic groups do not contribute to the specific capacity since they are not ion exchange groups. In an embodiment, the first particle can have a specific capacity that is twice as much as the second particle. The first particle can have a diameter that is approximately the same diameter as the second particle.

The first particle and the second particle can each independently have a diameter ranging from 2 nm to 100 nm, preferably range from 30 nm to 100 nm, and more preferably range from 50 nm to 70 nm. In an embodiment, the first particle and the second particle are smaller than the negatively charged substrate particle by a factor ranging from about 100× to about 5000×. For example, the charged substrate particle can have a diameter of 6.55 microns and the first particle can have a diameter of 56 nm and the second particle can have a diameter of 59 nm where the first particle is 117×'s smaller and the second particle is 111×'s smaller than the charged substrate particle.

The negatively charged substrate can be any inert polymeric substrate particle that is chemically stable under the intended conditions of use (e.g., pH 0 to 14). The negatively charged substrate can be in the form of particles, spherical particles, monoliths, and the inner surface of a chromatography column. The negatively charged substrate may include polymeric particle based on a divinylbenzene (DVB) crosslinking monomer and a support resin monomer where the support resin monomer may be an ethylvinylbenzene (EVB) monomer, a styrene monomer, and a combination thereof. The mole percent of DVB can be 55% and EVB can be 45%. The substrate particles may have a diameter ranging from about 1 micron to about 20 microns, preferably from about 2 microns to about 10 microns, and more preferably from about 3 microns to about 7 microns. The support resin particles may have a surface area ranging from about 20 $m^2/g$ to about 800 $m^2/g$, preferably from about 20 $m^2/g$ to about 500 $m^2/g$, more preferably from about 20 $m^2/g$ to about 100 $m^2/g$, and yet more preferably be about 20 $m^2/g$ to about 30 $m^2/g$. The support resin particles may have a pore size ranging from about 1000 angstroms to about 2000 angstroms.

In some embodiments, the negatively charged substrate particle may include one or more super macroporous particles (SMP). SMP can be obtained from commercial sources, including Agilent PLRP-s1000A and Waters Styragel HR4-HR6. The super macroporous particle can have a diameter of 4-7 μm, a surface area of 20-30 $m^2/g$, pore sizes of 1000 Å-2000 Å, and a crosslinking mole ratio of 55% of the divinylbenzene and a mole ratio of 45% of the ethylvinylbenzene.

Alternatively, the polymeric particles may be based on other vinylaromatic monomers such as alpha-methylstyrene, chlorostyrene, chloromethylstyrene, vinyltoluene, vinylnaphthalene, and a combination thereof. The polymeric particles may also be based on unsaturated monomers, and copolymers of the above vinylaromatic monomers and unsaturated monomers. Preferably such monomers will be copolymerized with a vinylaromatic crosslinking monomer such as divinylbenzene but other vinylaromatic crosslinking monomers such as trivinylbenzene, divinylnaphthalene, and a combination thereof may also be used.

The polymeric particles can be sulfonated to create a negative charge at least on the surface of the particle. For example, particles made with 45% DVB and 55% EVB can be sulfonated by treating the particles with glacial acetic acid and concentrated sulfuric acid.

Figure 2:
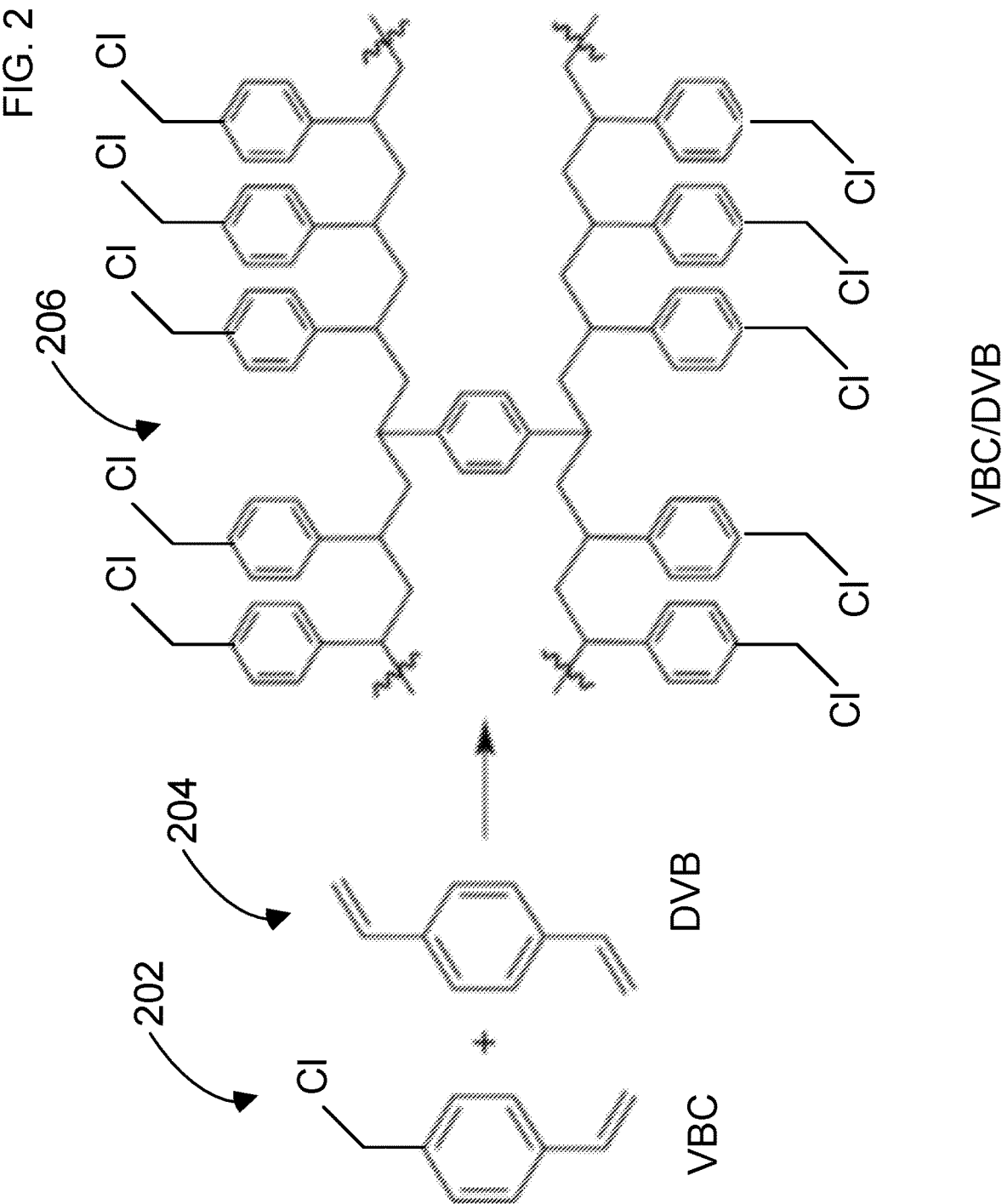
FIG. 2 illustrates a schematic chemical reaction for preparing a precursor substrate for the first or the second particle that is a copolymer of vinylbenzylchloride and divinylbenzene.

FIG. 2 illustrates a schematic chemical reaction for preparing a precursor substrate 206 for the first or the second particle that can be a copolymer of vinylbenzylchloride (VBC 202) and divinylbenzene (DVB 204). The VBC 202 and the DVB 204 can be copolymerized through a free radical process to form a precursor first or second particle (VBC/DVB 206). It is worthwhile to note that the VBC/DVB 206 precursor substrate has residual VBC groups that can participate in subsequent reactions such as attaching ion exchange groups.

Figure 3:
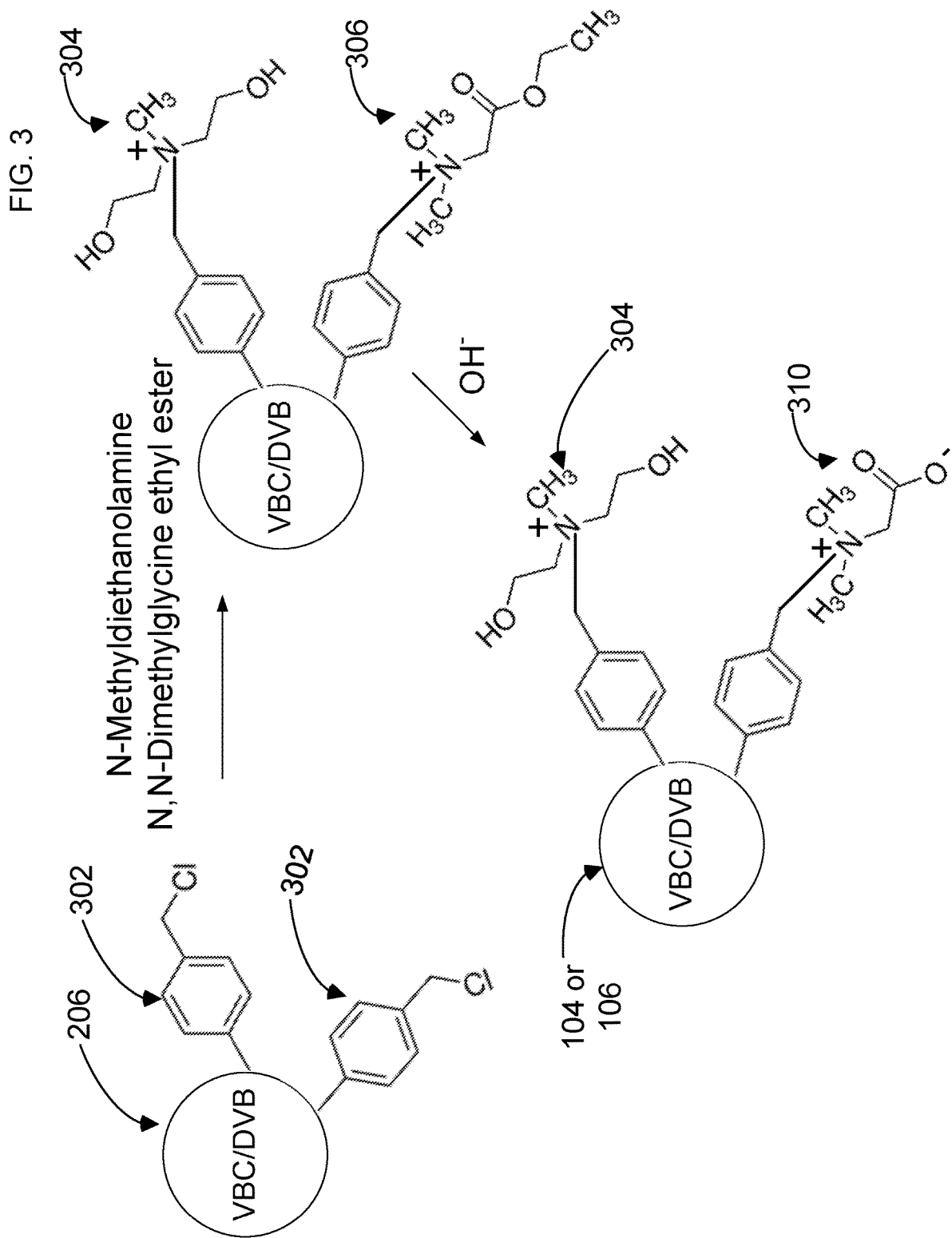
FIG. 3 illustrates a schematic chemical reaction for preparing the first or the second particle that include a quaternary amine anion exchange group and a zwitterionic group.

FIG. 3 illustrates a schematic chemical reaction of the precursor substrate VBC/DVB 206 with reagents for forming a quaternary amine anion exchange group and a zwitterionic group. The residual VBC groups 302 can react with N-methyldiethanolamine (MDEOHA) to form an anion exchange group 304 having a quaternary amine with two ethanol moieties. At the same time, other residual VBC groups 302 can react with and N,N-dimethylglycine ethyl ester (DMGEE) to form an intermediate group 306 having a quaternary amine and an ester moiety. Next, the intermediate group 306 can be hydrolyzed with hydroxide to form a zwitterionic groups 310 where the ester is converted to a carboxylate moiety. In contrast to ion exchange group 304, zwitterionic group 310 does not have a strong affinity to anions or cations. Thus, increasing the concentration of DMGEE in the reaction mixture can cause a decrease in the number of MDEOHA groups that attach to the precursor substrate VBC/DVB 206. In an embodiment, the second particle can be synthesized with a same MDEOHA concentrations as the first particle, but have a higher DMGEE reagent concentration that causes the second particle to have a specific capacity that is about half of the first particle and a higher proportion of zwitterionic groups than the first particle.

Figure 4:
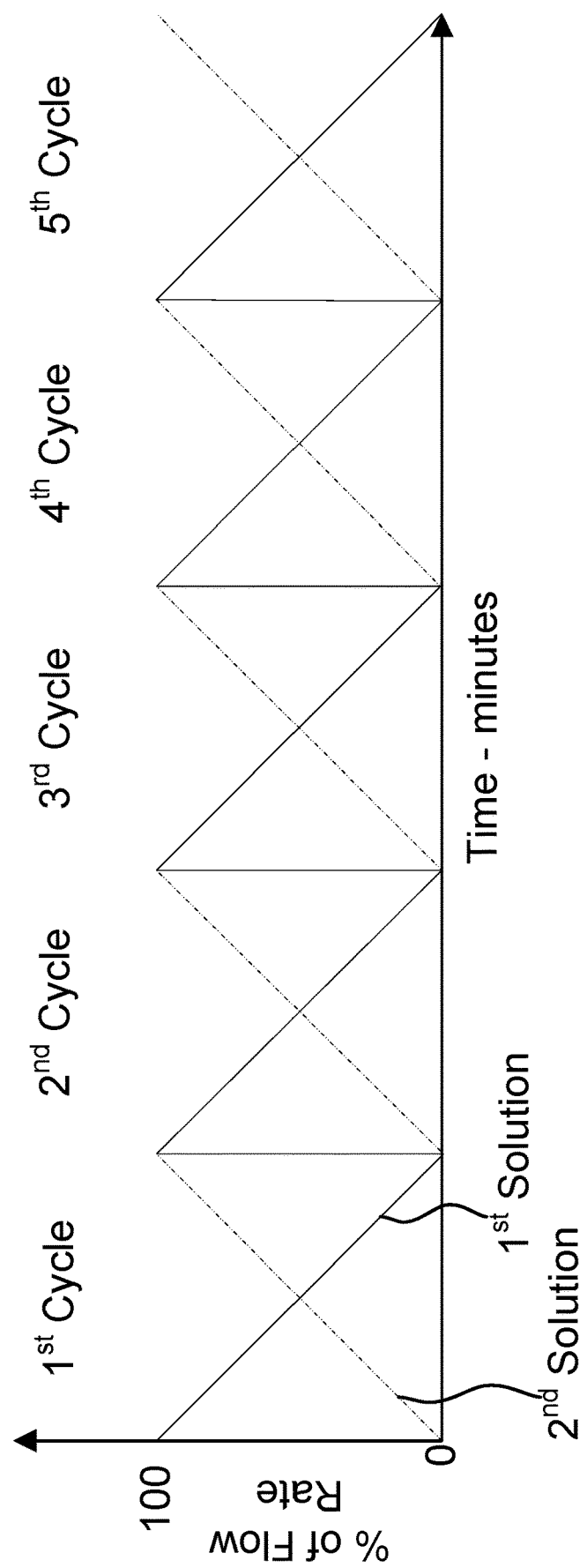
FIG. 4 is a chart showing a percent of the flow rate from the first solution (dotted line) and the second solution (solid line) as a function of time where the percent of the flow rate of the two solutions in the mixture each change in a sawtooth manner.

FIG. 4 is a chart showing a percent of the flow rate from the first solution (dotted line) and the second solution (solid line) as a function of time where the percent of the flow rate of the two solutions in the mixture each change in a sawtooth manner. The first solution and the second solution can be mixed together to form a mixture that is then flowed through a chromatography column where a proportion of the first solution and the second solution can be linearly varied as a function of time for a treatment cycle. The first solution can contain a plurality of first particles and the second solution can contain a plurality of second particles. In an embodiment, the first particles can have a higher specific capacity than the second particle such as, for example, a 2× higher specific capacity than the second particle. During a cycle, the proportion of the first solution decreases linearly from 100% to 0% (see solid line) and the proportion of the second solution increases linearly from 0% to 100% (see dotted line). After the first cycle, one or more successive cycles can be implemented. The number of cycles may range from about 2 to about 10. A cycle may have a time duration ranging from about 1 minute to about 20 minutes, and preferably about 10 minutes to about 20 minutes. Although a saw tooth pattern was implemented in FIG. 4, other embodiments can implement a different pattern for varying the proportion of the first and second solutions such as a sine wave or a non-linear waveform.

Figure 5:
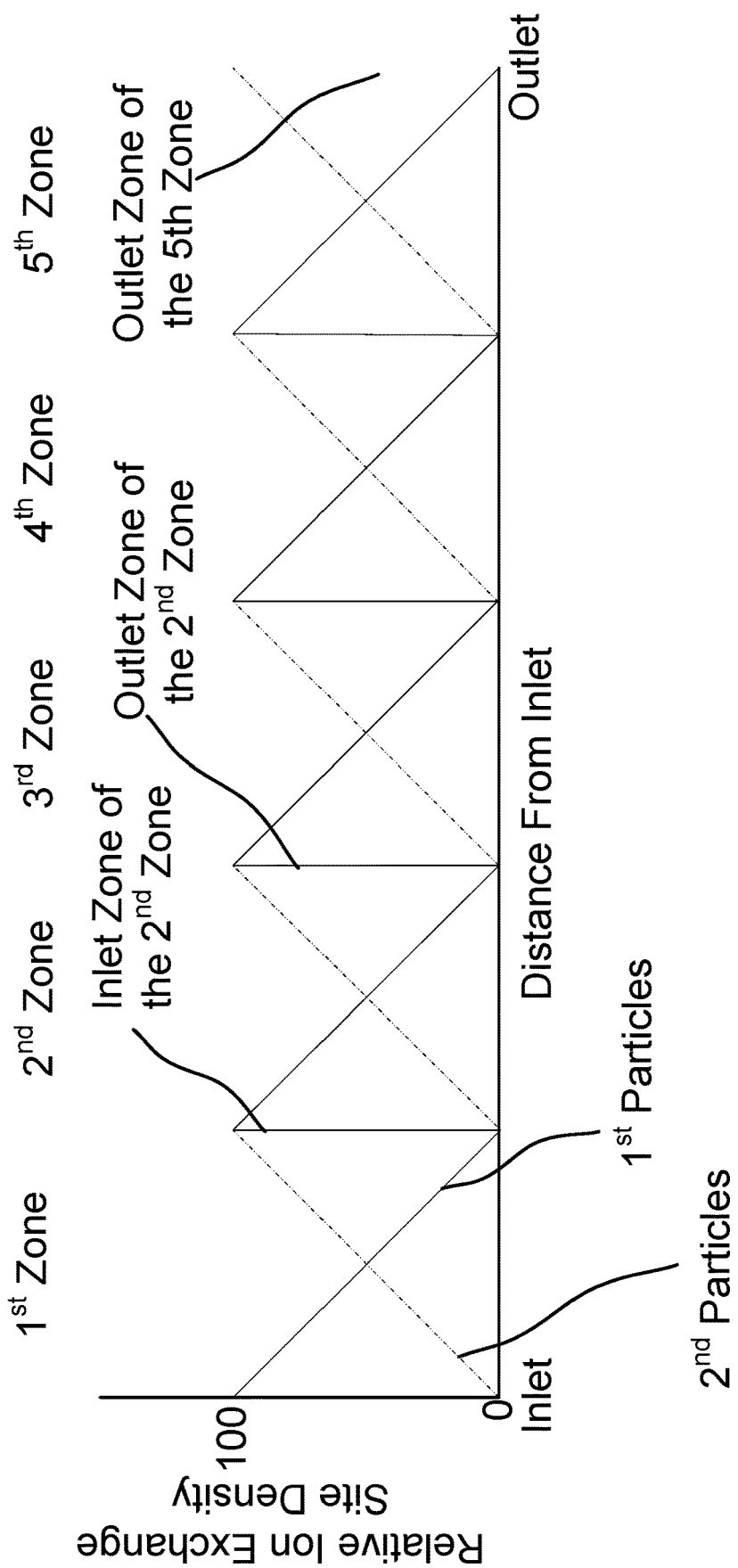
FIG. 5 is a chart showing a relative ion exchange density of the first particles (dotted line) and the second particles (solid line) as a function of distance where the relative ion exchange density changes in a sawtooth manner for the first particles and the second particles.

FIG. 5 is a chart showing a relative ion exchange density of the first particles (dotted line) and the second particles (solid line) as a function of distance from the inlet of the chromatography column where the relative ion exchange density changes in a sawtooth manner for the first particles and the second particles. The treatment of a chromatography column with the first and second solutions is in accordance with FIG. 4 and results in a chromatography column having a series of five successive zones. Each zone from the inlet zone to the outlet zone has a linearly decreasing concentration of the first particles and a linearly increasing concentration of the second particles. The first, second, third, fourth, and fifth cycles in FIG. 4 respectively corresponds to the first, second, third, fourth, and fifth zones of FIG. 5. The first and second ion exchange particle ionically bind strongly for coating the negatively charged substrate quickly upon contact. Thus, the distribution of the first particles and the second particles bound to the charged substrate reflect and correspond to the proportions added to the column.

In an embodiment, the treatment cycles can be configured so that all of the negatively charged substrate is coated with first and/or second particles bound at the outlet zone adjacent to the outlet of the chromatography column. Configuring the treatment cycle can include setting a time duration and a flow rate. The treatment cycles can be configured so that no portion of the negatively charged substrate is uncoated with first or second particles. In addition, the treatment cycle and the number of treatment cycles can be configured so that end of the last cycle corresponds to a coating of the last outlet zone. A breakthrough volume of liquid for flowing either the first solution or the second solution can be calculated. For instance, either the first solution or second solution can be flowed through a column containing negatively charged substrate particles and the output can be monitored for the first initial detection of first or second particles. The minimum volume of fluid passing through the column required for an initial breakthrough where the particles are not fully retained by the column is referred to as the breakthrough volume. The volume for one treatment cycle can be calculated that represents the volume of the mixture of the first solution and/or the second solution that is flowed into the inlet of the chromatography column. The volume of one treatment cycle multiplied by the number of treatment cycles can be configured so that the product equals the breakthrough volume.

Figure 6:
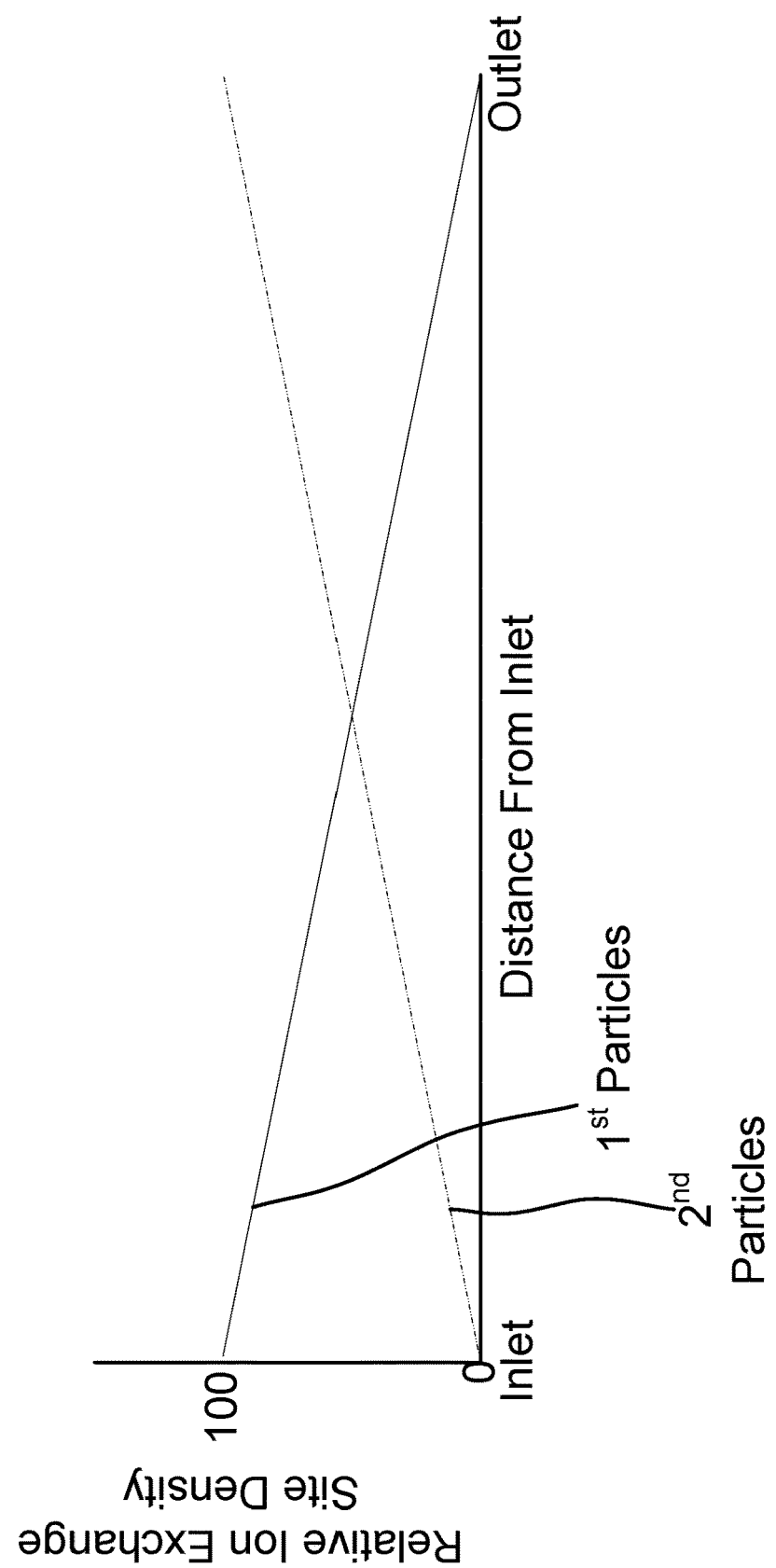
FIG. 6 is a chart showing a relative ion exchange density of the first particles (dotted line) and the second particles (solid line) as a function of distance where the relative ion exchange density changes in a linear manner for the first particles and the second particles.

In an alternative embodiment, a single zone can be created instead of using multiple successive zones. For instance, FIG. 6 shows a chart of the relative ion exchange density of the first particles (dotted line) and the second particles (solid line) as a function of distance from the inlet of the chromatography column where the relative ion exchange density changes linearly over a single time period.

In an embodiment, the ion exchange stationary phase can include an anion exchange stationary phase. In an alternative embodiment, the ion exchange stationary phase can include a cation exchange stationary phase where the first particles and the second particles may include first cation exchange groups and second cation exchange groups, respectively. The first cation exchange groups and second cation exchange groups may include a sulfonate, a carboxylate, and a combination thereof.

Now that longitudinal gradient chromatography columns have been described, the following will describe the equipment that can be used for coating columns and the use of the chromatography columns. FIG. 8 illustrates a simplified schematic of a system 800 for coating a chromatography column with two types of fine layering particles. In an embodiment, first pump 810 can pump a first solution that has a first concentration of first particles. Second pump 812 can pump a second solution that has a second concentration of second particles. The output of the first pump 810 and the second pump 812 can be inputted into junction 816 via tubings 814 and 818, respectively, to combine the two liquids, as illustrated in FIG. 8. Junction 816 may be in the form of a "tee" junction (i.e. T-junction). Where additional mixing is needed in addition to that provided by junction 816, an optional mixer 820 may be used before injecting the mixture into chromatography column 514. After the combination of liquids from the first pump 810 and the second pump 812, the mixed liquid can flow to chromatography column 514 and then detector 516. The detector 516 can be used to detect any output of first or second particles that are not bound to the chromatography column 514.

The flow rate of first pump 810 and second pump 812 can be varied so that different proportions of the first and second solutions can be generated. In an embodiment, the flow rate can be 0.25 mL/min. The first pump and the second pump can be combined so that the flow rate flowing into the chromatography column is about 0.25 mL/min. Depending on the operation, the contribution of the first pump and the second pump to the flow rate can be varied with time. The first pump 810 and second pump 812 can be syringe pumps. The first pump 810 and second pump 812 can alternatively be replaced with a pump and a simple proportioning valve setup that allows proportioning of the first and second solutions at different ratios. The system can be controlled by a software interface using a microprocessor.

FIG. 9 illustrates an embodiment of a chromatography system 500 suitable for use with the chromatographic columns described herein. Ion chromatography system 500 may include an autosampler 522, a pump 502, an electrolytic eluent generating device 503, a degas assembly 510, an injection valve 512, a chromatographic separation device 514, a suppressor 515, a detector 516, a microprocessor 518, and a reader 524 such as an RFID reader. A recycle line 520 may be used to transfer the liquid from an output of detector 516 to a regenerant portion of suppressor 515, and an inlet of degas assembly 510. Reader 524 may include a bar code reader or a contact mechanism for reading data using wires. It should be noted that the chromatography column made with the system 800 can be used in the chromatographic system 500.

Pump 502 can be configured to pump a liquid from a liquid source and be fluidically connected to electrolytic eluent generating device 503. Electrolytic eluent generating device 503 is configured to generate an eluent such as for example KOH or methanesulfonic acid. Details regarding electrolytic eluent generating devices can be found in U.S. Pat. Nos. 6,225,129 and 6,682,701, which are hereby incorporated by reference herein. In an embodiment, a residual gas may be carbon dioxide, hydrogen, and oxygen. The gas can be swept out of degas assembly 510 using a recycled liquid via a recycle line 520 that is downstream of detector 516. Injection valve 512 can be used to inject an aliquot of a liquid sample into an eluent stream. Chromatographic separation device 514 can be used to separate various matrix components present in the liquid sample from the analytes of interest. An output of chromatographic separation device 514 can be fluidically connected to suppressor 515, and then to detector 516 to measure the presence of the separated chemical constituents of the liquid sample.

Suppressor 515 is a device used in ion chromatography to remove the eluent and sample counterions and replace them with regenerant ions. As a result, the eluent is converted to a weakly dissociated form prior to entering the detector. The suppressor allows analyte ions to be detected with a conductivity detector with a low background. Furthermore, the analytes can be converted to the more conductive acid or base form, which enhances the signal, particularly for fully dissociated species. Detail regarding suppressors can be found in U.S. Pat. Nos. 4,999,098; 6,328,885; and 8,415,168 which are hereby fully incorporated by reference herein.

Detector 516 may be in the form of ultraviolet-visible spectrometer, a fluorescence spectrometer, an electrochemical detector, a conductometric detector, a charge detector, or a combination thereof. Details regarding the charge detector that is based on a charged barrier and two electrodes can be found in US Pre-Grant Publication No. 20090218238, which is hereby fully incorporated by reference herein. For the situation where recycle line 520 is not needed, detector 516 may also be in the form of a mass spectrometer or a charged aerosol detector. The charged aerosol detector nebulizes the effluent flow and creates charged particles that can be measured as a current proportional to the analyte concentration. Details regarding the charged aerosol detector can be found in U.S. Pat. Nos. 6,544,484; and 6,568,245, which are hereby fully incorporated by reference herein.

Microprocessor 518 can include a central processing unit for execution software code and one or more memory portions. Microprocessor 518 can be in the form of an electronic circuit and can be used to control the operation of chromatography system 500. Microprocessor 518 may either be integrated into chromatography system 500 or be part of a personal computer that communicates with chromatography system 500.

Microprocessor 518 may be configured to communicate with and control one or more components of chromatography system such as autosampler 522, reader 524, pump 502, electrolytic eluent generating device 503, injection valve 512, and detector 516. Note that chromatography system 500 is a particular machine used to analyze standard solutions and sample solutions to identify chemical constituents and the associated concentration values.

Example 1—Preparation of Layering Particles with High Anion Exchange Group Density An aqueous solution was prepared in a 16 oz. narrow neck bottle with 800.04 grams of water, 10.13 grams of KBr, 51.01 grams of a Triton X-405 surfactant, 2.72 grams of potassium persulfate ($K_2S_2O_8$), 40.39 grams of vinylbenzylchloride (VBC), 1.83 grams of divinylbenzene (DVB, containing 55% of actual divinylbenzene), and 2.51 grams of sodium metabisulfite ($K_2S_2O_5$) after which it was stirred while purging with nitrogen for four minutes. The bottle was capped and tumbled in a water bath at 6.2 revolutions per minute and held at 32° C. for 11.5 hours to complete the polymerization and form the particle suspension (see 206 of FIGS. 2 and 3). Two drops of the particle suspension were added to a cuvette for a light scattering measurement indicating that the particle size was 37.5 nm in diameter along with a polydispersity of 2.6%.

90.05 grams of N-methyldiethanolamine (MDEOHA) and 4.503 grams of N,N-dimethylglycine ethyl ester (DM-GEE) were mixed with 180.56 grams of water to form an amine solution. The amine solution was poured slowly into 450.3 grams of the particle suspension while stirring. The amine solution-particle suspension mixture was incubated in an oven at 65° C. for 4.5 days to form the anion exchange particle suspension (see 104 of FIGS. 1 and 3). Two drops of the anion exchange particle suspension were added to a cuvette for a light scattering measurement indicating that the particle size was 55.6 nm in diameter along with a polydispersity of 15.0%. The anion exchange particle suspension was filtered and then deionized to remove amines from the anion exchange particles by passing the anion exchange particle suspension through a column containing about 9 mL of Dowex 50WX8 strong cation exchange resin (50-100 micron particle size hydrogen form) causing the pH to shift from 11 to 3. The deionized material formed the final anion exchange suspension where the suspended particles formed in this Example can be referred to as the first particles.

Example 2—Preparation of Layering Particles with a Lower Anion Exchange Group Density than the Particles of Example 1

An aqueous solution was prepared in a 16 oz. narrow neck bottle with 400.06 grams of water, 5.16 grams of KBr, 25.01 grams of a Triton X-405 surfactant, and 1.36 grams of potassium persulfate ($K_2S_2O_8$), 20.02 grams of vinylbenzylchloride (VBC), 0.92 grams of divinylbenzene (DVB, containing 55% of actual divinylbenzene), and 1.26 grams of metabisulfite ($K_2S_2O_5$) after which it was stirred and purged with nitrogen for 3 minutes. The bottle was capped and tumbled in a water bath at 6.2 revolutions per minute and held at 32° C. for 7 hours to complete the polymerization and form the particle suspension (see 206 of FIGS. 2 and 3). Two drops of the particle suspension were added to a cuvette for a light scattering measurement indicating that the particle size was 32.2 nm in diameter along with a polydispersity of 3.3%.

90.04 grams of N-methyldiethanolamine (MDEOHA) and 26.965 grams of N,N-dimethylglycine ethyl ester (DM-GEE) were mixed with 179.76 grams of water to form an amine solution. The amine solution was poured slowly into 449.8 grams of the particle suspension while stirring. The amine solution-particle suspension mixture was incubated in an oven at 65° C. for 21 hours to form the anion exchange particle suspension (see 106 of FIGS. 1 and 3). Two drops of the anion exchange particle suspension were added to a cuvette for a light scattering measurement indicating that the particle size was 59.2 nm in diameter along with a polydispersity of 3.0%. The anion exchange particle suspension was filtered and then deionized to remove amines from the anion exchange particles by passing the anion exchange particle suspension through about 9 mL of Dowex 50WX8 strong cation exchange resin (50-100 micron particle size hydrogen form) causing the pH to shift from 11 to 3. It was found that the specific capacity for the ion exchange particles of this Example was about 50% of the specific capacity for the ion exchange particles of Example 1. The relative specific capacity was determined by comparing the retention time for sulfate using columns from Example 1 and Example 2. The retention time for sulfate was found to be about twice as long for the chromatography column of Example 1 compared to the column of Example 2. The deionized material formed the final anion exchange suspension where the suspended particles formed in this Example can be referred to as the second particles.

Example 3—Longitudinal Gradient Chromatography Column Prepared with Five Successive Gradient Cycles to Form Chromatographic Stationary Phase Coated with Anion Exchange Layering Particles The following procedure describes a method for creating a chromatography column that used five successive gradient cycles of anion exchange layering particles. group 4.129 grams of SMP particles were slurried with 9.808 grams of a slurry solution. The SMP particles were 6.55 μm diameter DVB/EVB particles with surface sulfonation (one hour at room temperature) and a surface area of 20.8 m$^2$/g. The slurry solution contains 932 grams deionized water, 5 grams of Igepal CO-630 nonionic detergent, 50 grams of acetic acid, and 13 grams of ethylene diamine. The slurry solution was vacuum sonicated for 2 minutes. The slurry solution was packed into a 4 mm inner diameter by 250 mm PEEK column body at 5400 psi at 8 mL/min for 20 minutes. The total packing volume was 144.96 grams. A 10% solution of the anion exchange suspension of Example 1 was created by diluting the final anion exchange suspension of Example 1 by a factor of 10. Similarly, a 10% solution of the anion exchange suspension of Example 2 was created by diluting the final anion exchange suspension of Example 2 by a factor of 10. After the SMP particles were packed into the column, a mixture of a 10% solution of the anion exchange suspension of Example 1 and a 10% solution of the anion exchange suspension of Example 2 was passed through the column under gradient conditions where the anion exchange suspension of Example 1 decreases linearly from 100% to 0% over a 15 minute time duration for a treatment cycle. At the same time, during this treatment cycle, the proportion of the anion exchange suspension of Example 2 increases linearly from 0% to 100% over the 15 minute time duration. The treatment cycles were repeated 4 more times to provide a total of 5 successive 15 minute treatment cycles, which is in accordance with FIG. 4. After the 5 treatment cycles with anion exchange particles, deionized water was flowed through the column for 10 minutes under forward flow conditions and then followed by flowing 20% acetonitrile through the column for 1 hour. The flowing of the anion exchange particle mixture, deionized water, and 20% acetonitrile was performed at a flow rate of 0.25 mL/min.

Example 4—Longitudinal Gradient Chromatography Column Prepared with a Single Gradient Cycle to Form Chromatographic Stationary Phase Coated with Anion Exchange Layering Particles The following procedure describes a method for creating a chromatography column having a single gradient of anion exchange layering particles having a relative ion exchange group density in accordance with FIG. 6. SMP particles were packed into a column similar to Example 3. Next, a mixture of a 10% solution of the anion exchange suspension of Example 1 and a 10% solution of the anion exchange suspension of Example 2 was passed through the column under gradient conditions where the proportion of the anion exchange suspension of Example 1 decreases linearly from 100% to 0% over a 75 minute time duration for a treatment cycle. At the same time, during this treatment cycle, the proportion of the anion exchange suspension of Example 2 increases linearly from 0% to 100% over the 75 minute time duration. After the treatment with anion exchange particles, deionized water was flowed through the column for 10 minutes under forward flow conditions and then followed by flowing 20% acetonitrile through the column for 1 hour. The flowing of the anion exchange particle mixture, deionized water, and 20% acetonitrile was performed at a flow rate of 0.25 mL/min.

Example 5—Chromatography Column Prepared with an Isocratic Mode for Coating a 50:50 Blend to Form a Chromatographic Stationary Phase Coated with Anion Exchange Layering Particles of Examples 1 and 2

SMP particles were packed into a column similar to Example 3. Next, a 50:50 blend of a 10% solution of the anion exchange suspension of Example 1 and a 10% solution of the anion exchange suspension of Example 2 was passed through the column over a 75 minute time duration. After the treatment with anion exchange particles, deionized water was flowed through the column for 10 minutes under forward flow conditions and then followed by flowing 20% acetonitrile through the column for 1 hour. The flowing of the anion exchange particle mixture, deionized water, and 20% acetonitrile was performed at a flow rate of 0.25 mL/min.

Example 6—Chromatogram of Standard Solution Containing Eight Inorganic Anions

A chromatography column of was installed into a Thermo Scientific Dionex ICS-5000$^+$ ion chromatography system (commercially available from Thermo Fisher Scientific, Sunnyvale, Calif.). The chromatography columns of Examples 3-5 were each individually tested. A pump was used to pump deionized water into a Thermo Scientific Dionex EGC 500 KOH cartridge (Thermo Fisher Scientific, Sunnyvale, Calif.) for generating a KOH gradient. A temperature regulator was used to maintain a column temperature of 30° C. A Dionex AERS 500 suppressor (Thermo Fisher Scientific, Sunnyvale, Calif.) was used along with a Thermo Scientific conductivity detector. The Dionex AERS 500 suppressor typically uses a constant current to electrolyze water for regenerating the suppressor. Table 1 lists the relevant chromatographic system conditions for each type of chromatography column tested such as flow rate, injection volume, the gradient elution parameters, the suppressor format (for corresponding tubing diameter of the system), and applied current to the suppressor.

TABLE 1

| Column Type | Flow Rate (mL/min) | Injection Volume (µL) | Time (minutes) | KOH Concentration (mM) | AERS Format (mm)/Current (mA) |
|---|---|---|---|---|---|
| Example 3 | 1.0 | 25 | 0-30 | 10-50 | 4/124 |
| Example 4 | 1.0 | 25 | 0-30 | 10-50 | 4/124 |
| Example 5 | 1.0 | 25 | 0-30 | 10-50 | 4/124 |

Figure 7:
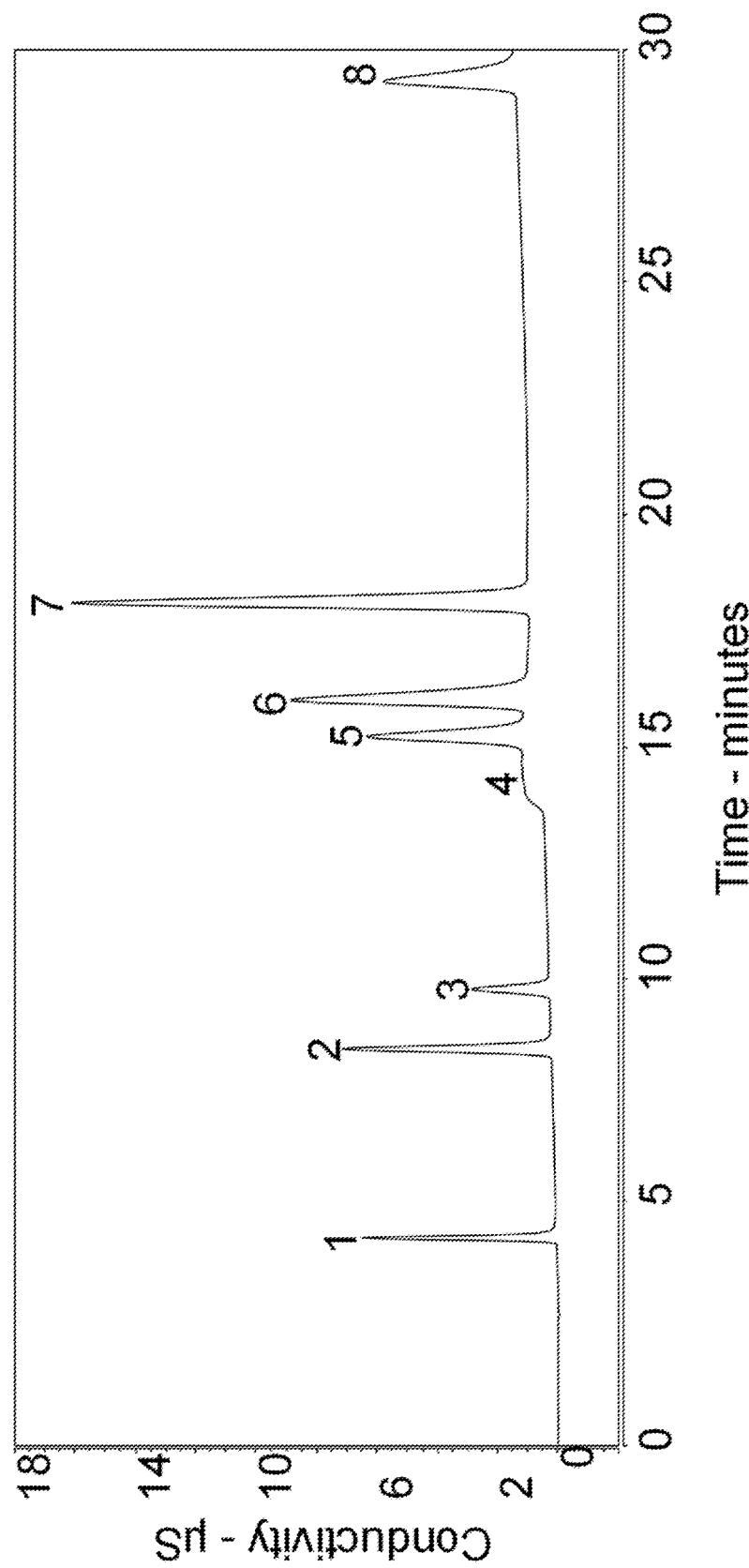
FIG. 7 is a chromatogram that shows a separation of a sample that contains 8 anions using a longitudinal gradient chromatography column with a gradient elution.

The chromatograms were run using a standard solution that contains the anions listed in Table 2 below. FIG. 7 shows a chromatogram for separating a sample that contains 8 anions using a longitudinal gradient chromatography column of Example 3 with a gradient elution.

TABLE 2

| Peak No. | Anion | ppm |
|---|---|---|
| 1 | Fluoride | 1 |
| 2 | Chloride | 3 |
| 3 | Nitrite | 5 |
| 4 | Carbonate | ? |
| 5 | Bromide | 10 |
| 6 | Nitrate | 10 |
| 7 | Sulfate | 15 |
| 8 | Phosphate | 15 |

Table 3 shows the peak width at half height (PW@HH) and peak efficiency (N) from the three chromatograms generated with one of the chromatography columns of Example 3 (5 Successive Cycles), Example 4 (One Cycle), and Example 5 (50:50 Latex Blend). In general, the chromatography column of Example 3 provided the lowest PW@HH and the highest N values indicating the best chromatographic performance of the three Examples. PW@HH represents the width of the peak in units of time (minutes) at a peak height that is ½ of the peak maxima. The N value represents the number of theoretical plates.

TABLE 3

| Analyte | 50:50 Latex Blend-Ex. 5 | | One Cycle-Ex. 4 | | 5 Successive Cycles-Ex 3 | |
|---|---|---|---|---|---|---|
| | PW@HH | N | PW@HH | N | PW@HH | N |
| Fluoride | 0.112 | 9020 | 0.127 | 10789 | 0.097 | 11788 |
| Chloride | 0.17 | 13888 | 0.172 | 13966 | 0.152 | 17299 |
| Nitrite | 0.19 | 14587 | 0.197 | 14140 | 0.173 | 17774 |
| Bromide | 0.27 | 17351 | 0.296 | 15092 | 0.246 | 21211 |
| Nitrate | 0.298 | 15727 | 0.337 | 12850 | 0.282 | 17882 |
| Sulfate | 0.246 | 28666 | 0.283 | 22269 | 0.241 | 31345 |
| Phosphate | 0.323 | 42747 | 0.345 | 29764 | 0.329 | 43952 |

Table 4 shows the percent difference of the PW@HH of Example 3 compared to Example 5 and the percent difference of the PW@HH of Example 3 compared to Example 4.

TABLE 4

| Analyte | 5 Successive Cycles - Ex 3 Compared to 50:50 Latex Blend - Ex. 5 | | 5 Successive Cycles - Ex 3 Compared to One Cycle - Ex. 4 | |
|---|---|---|---|---|
| | PW@HH | N | PW@HH | N |
| Fluoride | -13% | 31% | -24% | 9% |
| Chloride | -11% | 25% | -12% | 24% |
| Nitrite | -9% | 22% | -12% | 26% |
| Bromide | -9% | 22% | -17% | 41% |
| Nitrate | -5% | 14% | -16% | 39% |
| Sulfate | -2% | 9% | -15% | 41% |
| Phosphate | 2% | 3% | -5% | 48% |

The results indicate that the format of 5 successive zones of gradient distribution of ion exchange sites improved performance compared to the control experiment of using a uniform distribution of ion exchange sites (with Example 5) with similar total amounts of the ion exchange particles of Examples 1 and 2. The results also indicate that the format of 5 successive zones of gradient distribution appears to improve the results compared to having only a single zone of gradient distribution (with Example 4).

While preferred embodiments of the present invention have been shown and described herein, it will be apparent to those skilled in the art that such embodiments are provided by way of example only. Numerous variations, changes, and substitutions will now occur to those skilled in the art without departing from the invention. While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well.

What is claimed is:

1. An ion exchange chromatography column containing an ion exchange stationary phase, the ion exchange stationary phase comprising:
    a) a charged substrate;
    b) a plurality of first particles each including first ion exchange groups and the first particles being ionically bound to the charged substrate, the first particles having a first ion exchange group density; and c) a plurality of second particles each including second ion exchange groups and the second particles being ionically bound to the charged substrate, the second particles having a second ion exchange group density, wherein the first ion exchange group density is greater than the second ion exchange group density, in which the first ion exchange groups and the second ion exchange groups both have a net charge of a same polarity, wherein the ion exchange chromatography column has a number of zones connected in series, the number of the zones ranging from about two to about ten, each zone comprising:
i) an inlet zone; and
ii) an outlet zone;
wherein a distance from the inlet zone to the inlet of the chromatography column is less than a distance from the outlet zone to the inlet of the chromatography column, and
a distance from the outlet zone to the outlet of the chromatography column is less than a distance from the inlet zone to the outlet of the chromatography column,
wherein the first particles are bound to the charged substrate at an initial first particle concentration at the inlet zone and a concentration of the first particles bound to the charged substrate decreases linearly from the inlet zone towards the outlet zone to form a final first particle concentration bound to the charged substrate at the outlet zone,
wherein the second particles are bound to the charged substrate at an initial second particle concentration at the inlet zone and a concentration of the second particles bound to the charged substrate increases linearly from the inlet zone towards the outlet zone to form a final second particle concentration bound to the charged substrate at the outlet zone.

2. The ion exchange chromatography column of claim 1, in which the charged substrate comprises a plurality of crosslinked divinylbenzene and ethylvinyl benzene particles having a negative charge, in which at least a surface of the particle includes a sulfonate group.

3. The ion exchange chromatography column of claim 1, in which the first particle has a diameter ranging from 30 nm to 100 nm, and the second particle has a diameter ranging from 30 nm to 100 nm.

4. The ion exchange chromatography column of claim 1, in which the second ion exchange group density ranges from about 10% to about 50% of the first ion exchange group density.

5. The ion exchange chromatography column of claim 1, in which the final first particle concentration and the initial second concentration are both about zero.

6. The ion exchange chromatography column of claim 1, in which the final first concentration is about 10% or less than the initial first concentration, and the initial second particle concentration is about 10% or less than the final second particle concentration.

7. The ion exchange chromatography column of claim 1, in which the ion exchange groups of the first particles and the second particles are each independently selected from a group consisting of a primary amine, a secondary amine, a tertiary amine, a quaternary amine, and a combination thereof.

8. The ion exchange chromatography column of claim 1, in which the first particles and the second particles each comprise quaternary amines.

9. An ion exchange chromatography column containing an ion exchange stationary phase, the ion exchange stationary phase comprising:
a) a charged substrate;
b) a plurality of first particles each including ion exchange groups and the first particles being ionically bound to the charged substrate, the first particles having a first ion exchange group density; and
c) a plurality of second particles each including ion exchange groups and the second particles being ionically bound to the charged substrate, the second particles having a second ion exchange group density, wherein the first ion exchange group density is greater than the second ion exchange group density, in which the first ion exchange groups and the second ion exchange groups both have a net charge of a same polarity,
wherein the first particles are bound to the charged substrate at an initial first particle concentration at the inlet of the chromatography column and a concentration of the first particles bound to the charged substrate decreases linearly from the inlet towards the outlet to form a final first particle concentration bound to the charged substrate,
wherein the second particles are bound to the charged substrate at an initial second particle concentration at the inlet and a concentration of the second particles bound to the charged substrate increases linearly from the inlet towards the outlet to form a final second particle concentration bound to the charged substrate.

10. An ion exchange chromatography column contains an ion exchange stationary phase, the ion exchange stationary phase is formed by a method comprising:
treating a charged substrate contained in a chromatography column with a number of treatment cycles, each treatment cycle comprising:
flowing a mixture of a first solution and a second solution into an inlet of a chromatography column, the first solution containing a plurality of first particles and the second solution containing a plurality of second particles, wherein the first particles include first ion exchange groups at a first ion exchange group density and the second particles include second ion exchange groups at a second ion exchange group density, wherein the first ion exchange groups and the second ion exchange groups have a net charge of a same polarity;
the mixture is at an initial first particle concentration at a beginning of the treatment cycle and decreases to a final first particle concentration at an end of the treatment cycle, and
the mixture is at an initial second particle concentration at the beginning of the treatment cycle and increases to a final second particle concentration at the end of the treatment cycle, wherein the charged substrate has a charge opposite to
a) a charge of the first particles, and
b) a charge of the second particles, wherein the first ion exchange group density is greater than the second ion exchange group density.

11. The ion exchange chromatography column of claim 10, in which the number of treatment cycles is one.

12. The ion exchange chromatography column of claim 10, in which the number of treatment cycles ranges from about two to about ten.

13. The ion exchange chromatography column of claim 10, in which the ion exchange groups of the first particles and the second particles are each independently selected from a group consisting of a primary amine, a secondary amine, a tertiary amine, a quaternary amine, and a combination thereof.

14. The ion exchange chromatography column of claim 10, in which the second ion exchange group density ranges from about 10% to about 50% of the first ion exchange group density.

15. The ion exchange chromatography column of claim 10, in which each treatment cycle has a time duration ranging from about 1 minute to about 20 minutes.

16. The ion exchange chromatography column of claim 10, in which each treatment cycle has a time duration ranging from about 10 minutes to about 20 minutes.

17. The ion exchange chromatography column of claim 10, in which the final first particle concentration and the initial second particle concentration are both about zero.

18. The ion exchange chromatography column of claim 10, in which the final first particle concentration is about 10% or less than the initial first particle concentration, and the initial second particle concentration is about 10% or less than the final second particle concentration.

19. The ion exchange chromatography column of claim 10, in which the first particles and the second particles each comprise quaternary amines.

20. The ion exchange chromatography column of claim 10, in which the first particles and the second particles are each ionically bound to the charged substrate.

21. The ion exchange chromatography column of claim 10 further comprises:
flowing the first solution into a mixer;
flowing the second solution into the mixer to form the mixture before the flowing of the mixture into the inlet of the chromatography column.

\* \* \* \* \*